United States Patent
Mineji et al.

(10) Patent No.: US 8,388,770 B2
(45) Date of Patent: Mar. 5, 2013

(54) COLD-ROLLED STEEL SHEET, METHOD OF PRODUCING THE SAME, BATTERY, AND METHOD OF PRODUCING THE SAME

(75) Inventors: Nobuko Mineji, Tokyo (JP); Eiko Yasuhara, Tokyo (JP); Reiko Sugihara, Tokyo (JP); Tadashi Inoue, Tokyo (JP)

(73) Assignee: JFE Steel Corporation (JP)

(*) Notice: Subject to any disclaimer, the term of this patent is extended or adjusted under 35 U.S.C. 154(b) by 526 days.

(21) Appl. No.: 12/282,538

(22) PCT Filed: Mar. 13, 2007

(86) PCT No.: PCT/JP2007/055582
§ 371 (c)(1),
(2), (4) Date: Sep. 11, 2008

(87) PCT Pub. No.: WO2007/111188
PCT Pub. Date: Oct. 4, 2007

(65) Prior Publication Data
US 2009/0025838 A1    Jan. 29, 2009

(30) Foreign Application Priority Data

Mar. 16, 2006 (JP) ............... 2006-072603
Dec. 26, 2006 (JP) ............... 2006-349293

(51) Int. Cl.
*C22C 38/00* (2006.01)
*C22C 38/14* (2006.01)
(52) U.S. Cl. ......... 148/330; 420/121; 420/126; 420/127
(58) Field of Classification Search .......... 148/328, 148/330; 420/121, 126, 127, 129, 590
See application file for complete search history.

(56) References Cited

U.S. PATENT DOCUMENTS

| | | | |
|---|---|---|---|
| 5,576,113 A * | 11/1996 | Hirofumi et al. | 428/679 |
| 6,171,416 B1 | 1/2001 | Aratani et al. | |
| 6,743,306 B2 * | 6/2004 | Nakajima et al. | 148/328 |

FOREIGN PATENT DOCUMENTS

| | | |
|---|---|---|
| JP | 63-310924 A | 12/1988 |
| JP | 4-66620 A | 3/1992 |
| JP | 9-272952 A | 10/1997 |
| JP | 9-310150 A | 12/1997 |
| JP | 10-46243 A | 2/1998 |
| JP | 10-81919 A | 3/1998 |
| JP | 2000-129362 A | 5/2000 |
| JP | 2000-160289 A | 6/2000 |
| JP | 2001-200336 A | 7/2001 |

* cited by examiner

*Primary Examiner* — Scott Kastler
*Assistant Examiner* — Vanessa Luk
(74) *Attorney, Agent, or Firm* — DLA Piper LLP (US)

(57) ABSTRACT

A cold-rolled steel sheet has a composition containing, by mass percent, 0.0040% or less of C, 0.02% or less of Si, 0.14% to 0.25% of Mn, 0.020% or less of P, 0.015% or less of S, 0.0040% or less of N, 0.020% to 0.070% of Al, 0.005% to 0.030% of Nb, 0.005% to 0.030% of Ti, (0.0003% to 0.0010% of the equivalent amount of solid solution B (from which the amount of B forming BN has been subtracted)), and the balance composed of Fe and inevitable impurities, wherein even when the rolling reduction of cold rolling is 85% or less, the average grain size of a ferrite structure is reliably 12.0 μm or less, and the relationship $-0.20 \leq \Delta r \leq 0.20$ can be reliably satisfied and which has an excellent earing property.

6 Claims, 1 Drawing Sheet

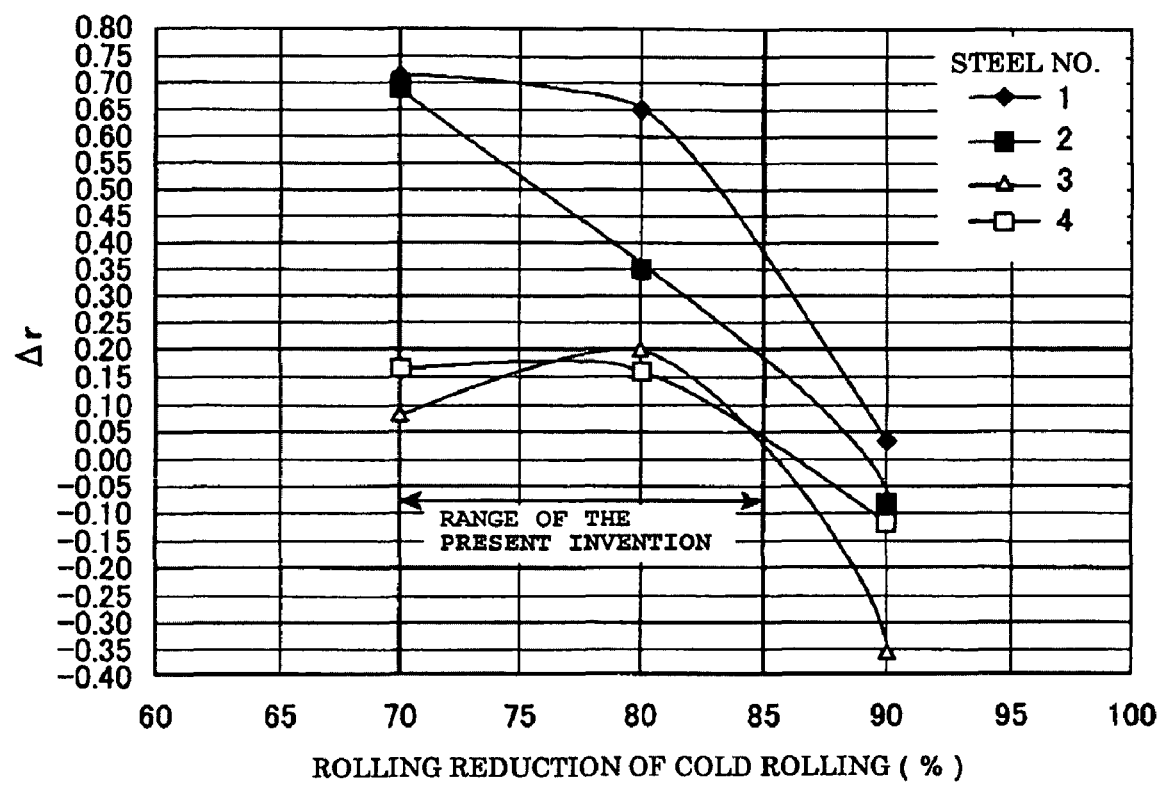

COLD-ROLLED STEEL SHEET, METHOD OF PRODUCING THE SAME, BATTERY, AND METHOD OF PRODUCING THE SAME

RELATED APPLICATIONS

This is a §371 of International Application No. PCT/JP2007/055582, with an international filing date of Mar. 13, 2007 (WO 2007/111188, A1, published Oct. 4, 2007), which is based on Japanese Patent Application Nos. 2006-072603, filed Mar. 16, 2006, and 2006-349293, filed Dec. 26, 2006.

TECHNICAL FIELD

This disclosure: relates to a cold-rolled steel sheet particularly suitable for a battery case, and a method of producing the same.

BACKGROUND

As regards a method of working a cold-rolled steel sheet to form a battery case, a method appropriately combining deep drawing with ironing is used. Examples of the method include a DI process in which a steel sheet is deep-drawn to form a drawn cup and ironing is then performed; stretch-draw forming in which a steel sheet is deep-drawn to form a drawn cup, stretching and bending-unbending are then performed, and ironing is further performed, as needed; and a multi-stage drawing process in which drawing is performed in several stages, and ironing is then performed.

In working a battery case, it is desired to suppress the generation of ears (called "earing"), more specifically, to prevent the height of the can after the working from being uneven in the circumferential direction thereof. It is generally known that the height of such an ear significantly correlates with planar anisotropy Δr of the r value (Lankford value) of a steel sheet for a battery case, and that as Δr approaches zero, the height of the ear decreases. Accordingly, to suppress earing, desirably, Δr of the steel sheet for a battery case is controlled to be close to zero.

To reduce Δr of a cold-rolled steel sheet, means for increasing the rolling reduction in cold rolling is usually employed. However, at a-high rolling reduction, the dependency of Δr on the rolling reduction increases, and thus, a variation in Δr is easily generated and an increase in the rolling load due to the high rolling reduction may be caused. Therefore, it is desired that a cold-rolled steel sheet be produced at a rolling reduction of at least 90% or less, and more preferably, 85% or less.

To prevent degradation of a can shape due to wrinkles called "stretcher strain" generated during deep drawing, it is desired that a steel sheet for a battery case have excellent strain aging resistance. In addition, to suppress surface roughening during working, it is also desired that a steel sheet for a battery case have fine crystal grains.

As such a steel sheet for a battery case, hitherto, interstitial free steels (IF steels), which are suitable for deep drawing and to which Nb and/or Ti is added, have been studied. For example, Japanese Unexamined Patent Application Publication No. 10-81919 discloses a method of producing a steel sheet for a two-piece can having an excellent earing property and surface roughening resistance. In the method, a steel slab containing at least one type of element selected from, by mass percent, 0.0005% to 0.0150% of C, 0.10% or less of Si, 0.1% to 0.6% of Mn, 0.02% or less of P, 0.02% or less of S, 0.015% to 0.15% of Al, 0.02% or less of N, 0.020% or less of Nb, 0.020% or less of Ti, and 0.0001% to 0.0030% of B, and the balance composed of Fe and inevitable impurities is hot-rolled, cold-rolled, and annealed to form recrystallized grains having an ASTM grain size number of 10 or more and a crystal grain axial ratio of 1.2 or less. Subsequently, a secondary cold rolling is performed at a rolling reduction in the range of 0.5% to 40%.

In addition, Japanese Unexamined Patent Application Publication No. 9-310150 discloses a steel sheet for a can having excellent workability, earing property, and surface roughening resistance. The steel sheet for a can contains at least one type of element selected from, by mass percent, 0.0005% to 0.015.0% of C, 0.10% or less of Si, 0.1% to 0.6% of Mn, 0.02% or less of P, 0.02% or less of S, 0.015% to 0.15% of Al, 0.02% or less of N, 0.020% or less of Nb, and 0.020% or less of Ti, and the balance composed of Fe and inevitable impurities, wherein crystal grains in a surface layer region from the surface of the steel sheet to 1/10 of the sheet thickness are composed of fine equiaxed crystal grain structure having an ASTM grain size number of 10 or more and a crystal grain axial ratio of 1.5 or less, and crystal grains in the inner layer of the steel sheet except for this surface layer are composed of coarse equiaxed crystal grain structure having an ASTM grain size number of 9 or less and a crystal grain axial ratio of 1.5 or less.

Furthermore, Japanese Unexamined Patent Application Publication No. 63-310924 discloses a method of producing an ultra-thin steel sheet having small planar anisotropy. In this method, a steel sheet having, a composition containing, by mass percent, 0.004% or less of C, 0.1% or less of Si, 0.5% or less of Mn, 0.025% or less of P, 0.025% or less of S, 0.006% or less of N, 0.001% to 0.100 of Al, 0.01% to 0.10% of Ti wherein the relationship $Ti \geq \{(48/12)C+(48/14)N\}$ is satisfied, 0.003% to 0.03% of Nb, and 0.0001% to 0.0010% of B, and the balance substantially composed of Fe except for inevitable impurities is hot-rolled under the conditions of a hot-rolling finishing temperature in the range of 850° C. to 900° C. and a winding temperature in the range of 300° C. to 600° C., cold-rolled, and then undergoes continuous annealing, followed by skin-pass rolling to reduce the thickness thereof in the range of 0.15 to 0.60 mm, wherein the cold-rolling reduction is controlled to be in the range of 85% to 95%, and the continuous annealing temperature is controlled to be in the range of 650° C. to 750° C.

However, in the steel sheets described in Japanese Unexamined Patent Application Publication Nos. 10-81919, 9-310150, and 63-310924, when the rolling reduction of cold rolling is 85% or less, which is a preferable value, the average grain size of a ferrite structure does not always stably become small (specifically, 12.0 μm or less), and Δr that is sufficiently close to zero (specifically, $-0.20 \leq \Delta r \leq 0.20$) is not always obtained.

It could therefore be helpful to provide a cold-rolled steel sheet in which even when the rolling reduction of cold rolling is, 85% or less, the average grain size of a ferrite structure can be reliably controlled to be 12.0 μm or less and the relationship $-0.20 \leq \Delta r \leq 0.20$ can be reliably satisfied and which has an excellent earing property, and a method of producing the same.

SUMMARY

We studied a cold-rolled steel sheet in which even when the rolling reduction of cold rolling is 85% or less, the relationship $-0.20 \leq \Delta r \leq 0.20$ can be reliably satisfied, using an IF steel to which Nb and/or Ti is added. As a result, we found that it is effective that boron (B) is added so that an appropriately amount of B is present in the form of a solid solution (i.e., solid solution B) before cold rolling. Note that even when the rolling reduction is more than 85%, in the case where the rolling reduction is 90% or less, Δr can be within ±0.20.

We therefore provide, a cold-rolled steel sheet having an excellent earing property and including, by mass percent, 0.0040% or less of C, 0.02% or less of Si, 0.14% to 0.25% of Mn, 0.020% or less of P, 0.015% or less of S, 0.0040% or less of N, 0.020% to 0.070% of Al, 0.020% to 0.030% of Nb, 0.005% to 0.030% of Ti, B in a content satisfying Formula (1) or Formula (2) below, and the balance composed of Fe and inevitable impurities, wherein the average grain size of a ferrite structure is 12.0 μm or less, and the relationship −0.20≦Δr≦0.20 is satisfied.

In the case of N−(14/48)Ti>0, $$0.0003 \leq B - (11/14)\{N - (14/48)Ti\} \leq 0.0010 \quad (1).$$

In the case of N−(14/48)Ti≦0, $$0.0003 \leq B \leq 0.0010 \quad (2).$$

Here, each of the symbols of elements in Formulae (1) and (2) represents the content. (mass percent) of the element.

The above cold-rolled steel sheet can be produced by, for example, a method of producing a cold-rolled steel sheet having an average grain size of a ferrite structure of 12.0 μm or less, satisfying the relationship −0.20≦Δr≦0.20, and having an excellent earing property, the method including the steps of hot-rolling a steel slab having the above component composition at a rolling finishing temperature of the $Ar_3$ transformation point or higher, cold-rolling the resulting steel sheet at a rolling reduction in the range of 70% to 90%, and then annealing the steel sheet in a continuous annealing line at an annealing temperature in the range of 750° C. to 800° C.

In addition, we provide a cold-rolled steel sheet having an excellent earing property and including, by mass percent, 0.0040% or less of C, 0.02% or less of Si, 0.14% to 0.25% of Mn, 0.020% or less of P, 0.015% or less of S, 0.0040% or less of N, 0.020% to 0.070% of Al, 0.005%, or more and less, than 0.020% of Nb, Ti in a content satisfying Formula (3) or Formula (4) below, B in a content satisfying Formula (1) or Formula (2) above, and the balance composed of Fe and inevitable, impurities, wherein the average grain size of a ferrite structure is 12.0 um or less, and the relationship −0.20≦Δr≦0.20 is satisfied.

In the case of C/12−Nb/93≦0, $$0.005 \leq Ti \leq 0.020 \quad (3).$$

In the case of C/12−Nb/93>0, $$48 \times \{(C/12 + N/14) - Nb/93\} \leq Ti \leq 0.020 \quad (4).$$

Here, each of the symbols of elements in Formulae (3) and (4) represents the content (mass percent) of the element.

The above cold-rolled steel sheet can be produced by, for example, a method of producing a cold-rolled steel sheet having an average grain size of a ferrite structure of 12.0 μm or less, satisfying the relationship −0.20≦Δr≦0.20, and having an excellent earing property, the method including the steps of hot-rolling a steel slab having the above component composition at a rolling finishing temperature of the $Ar_3$ transformation point or higher, cold-rolling the resulting steel sheet at a rolling reduction in the range of 70% to 90%, and then annealing the steel sheet in a continuous annealing line at an annealing temperature in the range of 700° C. to 800° C.

We also provide a battery including an battery can produced by forming the above-described cold-rolled steel sheet and a method of producing a battery including a step of deep-drawing the above-described cold-rolled steel sheet to form a battery can.

BRIEF DESCRIPTION OF DRAWING

FIG. 1 is a graph showing the effect of the rolling reduction (horizontal axis) in cold rolling on the Δr value (vertical axis) of steel sheets in accordance with the steel sheet compositions.

DETAILED DESCRIPTION

Cold-rolled steel sheets having an excellent earing property and a method of producing the cold-rolled steel sheet will now be described in detail.

(1) Component Composition (the Symbol "%" below Represents "Mass Percent")

C: As the carbon (C) content is decreased, the steel becomes soft and exhibits satisfactory elongation, and thus the steel is advantageous in terms of press workability. In addition, when carbon (C) contained in the form of a solid solution (solid solution C) is precipitated as a carbide, deep drawability can be improved without causing strain age hardening. If the C exceeds 0.0040%, it is difficulty to precipitate all the carbon as carbides of Nb and Ti. Consequently, hardening and degradation of elongation due to the solid solution C occur. Accordingly, the C content is 0.0040% or less, and preferably 0.0030% or less.

Note that the lower limit of the C, content that can be industrially realized is about 0.0001%.

Si: A silicon (Si) content more than 0.02% causes hardening and degradation of a plating property. Accordingly, the Si content is 0.02% or less. Note that the lower limit of the Si content that can be industrially realized is about 0.001%.

Mn: Manganese (Mn) is an element effective to prevent red shortness during hot rolling caused by sulfur (S), and thus, it is necessary to control the Mn content to be 0.14% or more. More preferably, the Mn content is 0.15% or more. On the other hand, if the Mn content exceeds 0.25%, MnS is precipitated during continuous casting, thereby causing hot shortness and resulting in steel slab cracking (also referred to as "cast slab cracking"), and in addition, the amount of solid solution Mn increases in the steel, thereby causing hardening and degradation of elongation. Also, at a high Mn content, the recrystallization temperature during annealing increases. Such an increase in the recrystallization temperature may cause a problem particularly in the case where the rolling reduction is 85% or less at which the driving force of recrystallization is low. Accordingly, the upper limit of the Mn content is 0.25%.

P: A phosphorus (P) content more than 0.020% degrades the workability, and thus, the upper limit of the P content is 0.020%. Note that the lower limit of the P content that can be industrially realized is about 0.001%.

S: If the sulfur (S) content exceeds 0.015%, red shortness may be caused during hot rolling, and MnS is precipitated during continuous casting, thereby causing hot shortness and resulting in cast slab cracking. Accordingly, the upper limit of the S content is 0.015%, but preferably, the S content should be minimized. Note that: the lower limit of the S content that can be industrially realized is about 0.0001%.

N: If the nitrogen (N) content exceeds 0.0040%, the workability is degraded by solid solution N. Accordingly, the upper limit of the N content is 0.0040%. More preferably, the N content is preferably 0.0030% or less. Note that the lower limit of the N content that can be industrially realized is about 0.0001%.

Al: Aluminum (Al) is an element required for deoxidation of a steel, and thus, it is necessary to control the Al content to be 0.020% or more. On the other hand, if the Al content exceeds 0.070%, the amount of inclusion increases, and thus, surface defects are easily generated. Accordingly, the upper limit of the Al content is 0.070%.

Nb: Niobium (Nb) is an important element. As in Ti, Nb allows solid solution C in the steel to precipitate as a carbide to suppress degradation of deep drawability due to the solid solution C. In addition, even a trace amount of addition of Nb is also effective to decrease the grain size of a hot-rolled sheet and to suppress the crystal grain growth during annealing. From this point of view, the Nb content is 0.005% or more. In particular, from the standpoint of the effects of decreasing the grain size and the suppressing crystal grain growth during annealing, the Nb content is preferably 0.020% or more. However, excessive addition of Nb increases the recrystallization temperature. Therefore, the upper limit of the Nb content is 0.030%.

Ti: Titanium (Ti) allows solid solution C in the steel to precipitate as a carbide to suppress degradation of deep drawability due to the solid solution C, as in Nb. Furthermore, since Ti precipitates as TiN at a high temperature, the formation of BN is suppressed, and thus solid solution B can be reliably ensured. On the other hand, excessive addition of Ti increases the recrystallization temperature, coarsens crystal grains during hot-rolling or annealing, thereby degrading the earing property, and causes surface roughening during working.

We found that, in our steel sheets, such effects of Ti are also dependent on Nb content, and optimum Ti content is dependent on Nb content.

(I) In the Case where the Nb Content is 0.020% or More and 0.030% or Less (this Case is Referred to as "High-Nb Composition"):

In this case, the effects of decreasing the grain size of hot-rolled sheet and suppressing the crystal grain growth during annealing achieved by Nb is significant. Accordingly, even when Ti is added in a relatively large amount, the above-mentioned adverse effects of Ti, do not occur. Therefore, the upper limit of the Ti content is 0.030%. If Ti is contained in a large amount of more than 0.030%, as described above, the recrystallization temperature increases, crystal grains are coarsened during hot-rolling or annealing, thereby degrading the earing property, and surface roughening during working is caused. Furthermore, in this case, to achieve the above-described effects of Ti, it is necessary to control the lower limit of the Ti content to be 0.005%.

(II) In the Case where the Nb Content is 0.005% or More and Less than 0.020% (this Case is Referred to as "Low-Nb Composition"):

In the case where the Nb content is relatively low, the effect of decreasing the grain size of a hot-rolled sheet and suppressing the crystal grain growth during annealing achieved by Nb is smaller than the case of (I) where 0.020% of more of Nb is added. Accordingly, even when the Ti content is lower than that in the case of (1), more specifically, when the Ti content exceeds 0.020%, the above-described adverse effects caused by excessive addition of Ti, namely, the phenomenon in which crystal grains are coarsened during hot-rolling or annealing, thereby degrading the earing property and the phenomenon in which surface roughening during working is caused, easily occur. Therefore, when the Nb content is 0.005% or more and less than 0.020%, it is necessary to control the upper limit of the Ti content to be 0.020%.

Furthermore, when the Nb content is relatively small as described above, namely, 0.005% or more and less than 0.020%, the lower limit of the Ti content required for achieving the above effects is different in accordance with the Nb content.

(a) In the case of $C/12-Nb/93 \leqq 0$, that is, in the case where the equivalent of the Nb content is equal to or higher than the equivalent of the C content (this case is referred to as "low-Nb(NbC) composition"), the lower limit of the Ti content required for achieving the above-described effects of Ti is 0.005%.

(b) In the case of $C/12-Nb/93>0$, that is, in the case where the equivalent of the Nb content is less than the equivalent of the C content, solid solution C that is not fixed (precipitated) by Nb must be more reliably fixed by Ti (this case is referred to as "low-Nb(NbC+C) composition"). As described above, it is believed that Ti first precipitates as TiN at a high temperature, and then allows solid solution C to precipitate as a carbide (TiC). Therefore, it is necessary to control the Ti content (equivalent) to be equal to or higher than the residual total content (equivalent) of C and N obtained after subtracting the amount of C and N precipitated by Nb from the total content of C and N. More specifically, in the case of $C/12-Nb/93>0$, it is necessary to control the lower limit of the Ti content to be $48 \times \{(C/12+N/14)-Nb/93\}$. In the case where the value-represented by $48 \times \{(C/12+N/14)-Nb/93\}$ is less than 0.005%, though such a case rarely occurs, preferably, 0.005% of more of Ti is added.

The Ti content is summarized as follows on the basis of the above description. In the case of the low-Nb(NbC) composition, it is necessary to satisfy Formula (3):

$$0.005 \leqq Ti \leqq 0.020 \qquad (3).$$

In the case of the low-Nb(NbC+C) composition, it is necessary to satisfy Formula (4):

$$48 \times \{(C/12+N/14)-Nb/93\} \leqq Ti \leqq 0.020 \qquad (4).$$

(Each of the symbols of elements in the formulae represents the content (mass percent) of the element.)

In the case where the Nb content is 0.005% or more and less than 0.020% (low-Nb composition) and the Ti content satisfies Formula (3) or Formula (4), the recrystallization temperature during annealing can be further decreased to an annealing temperature in the range of 700° C. to 800° C. In particular, an annealing temperature in the range of 700° C. to 750° C. is additionally advantageous in terms of the energy cost and productivity.

B: By controlling the solid solution boron (B) content to be 0.0003% or more before cold rolling, even when the rolling reduction of the cold roiling is 85% or less, the relationship $-0.20 \leqq \Delta r \leqq 0.20$ can be reliably satisfied. However, if this solid solution B content exceeds 0.0010%, the recrystallization temperature increases. Therefore, the upper limit of the solid solution B content is 0.0010% or less. Here, the solid solution B content is determined as follows. That is, solid solution B precipitates a nitride with solid solution nitrogen (N) in the steel, but solid solution N forms a precipitate more easily with Ti than with B. Accordingly, (B) In the case where Ti is present in the steel in an amount with which solid solution N can be fixed by precipitation, that is, in the case where Ti is present in the steel in an Equivalent equal to or larger than the equivalent of N (in the case of $N \leqq (14/48)Ti$) (this case is referred to as "(TiN) composition"), the solid solution B content is equal to the B content in the steel. On the other hand, (A) In the case where the equivalent of Ti is less than the equivalent of N (in the case of $N>(14/48)Ti$) (this case is referred to as "(TiN+N) composition"), N that is not fixed by precipitation with Ti in the steel forms a precipitate with B, and the solid solution B content is decreased accordingly, as compared with the B content in the steel. Accordingly, it is necessary that the solid solution B content obtained after subtracting this amount of decrease be in the range of 0.0003% to 0.0010%.

The B content is summarized as follows on the basis of the above description. To control the solid solution B content in the steel to be in the range of 0.0003% to 0.0010%, in the case of the (TiN+N) composition, it is necessary to satisfy Formula (1):

$$0.0003 \leq B-(11/14)\{N-(14/48)Ti\} \leq 0.0010 \quad (1).$$

In the case of the (TiN) composition, it is necessary to satisfy Formula (2):

$$0.0003 \leq B \leq 0.0010 \quad (2).$$

(Each of the symbols of elements in the formulae represents the content (mass percent) of the element.)

That is, five types of component designs, namely, high-Nb–(TiN+N) composition (wherein Formula (1) is applied), high-Nb–(TiN) composition (wherein Formula (2) is applied), low-Nb(NbC)–(TiN+N) composition (wherein Formulae (1) and (3) are applied), low-Nb(NbC)–(TiN) composition (wherein, Formulae (2) and (3) are applied), and low-Nb(NbC+C)–(TiN) composition (wherein Formulae (2) and (4) are applied)

are performed in accordance with the fixing states of C and N. In addition, the content of B for ensuring the solid solution B content is determined by Formula (1) or Formula (2) in accordance with the fixing state of N. Note that, in the case of the low-Nb(Nb+C) composition, the combination with the (TiN+N) composition is not present because, in addition to Ti used for fixing N, an excessive amount of Ti for fixing C is necessary, as described above.

The balance is composed of iron (Fe) and inevitable impurities. Various types of elements such as Sn, Pb, Cu, Mo, V, Zr, Ca, Sb, Te, As, Mg, Na, Ni, Cr, and rare-earth elements (REM) may be mixed as impurities in a total amount of about 0.5% or less in the production process, but these impurities also do not particularly affect the advantages.

(2) Characteristics of Steel Sheet

Average Grain Size of Ferrite Structure is 12.0 μm or Less:

The steel sheet is mainly composed of a polygonal ferrite structure (80% or more M terms of the cross-sectional area ratio), and the average grain size of the ferrite structure is 12.0 μm or less. That is, a steel sheet for a battery case requires a fine grain size to suppress surface roughening during working. Specifically, if the average grain size of the ferrite structure exceeds 12.0 μm, surface roughening occurs. Therefore, the average grain size is limited to 12.0 μm or less.

Note that, as the average grain size, the value measured in accordance with the cutting method described in JIS G 0552 (1998) is used, and the L-cross section (the cross section which penetrates in the steel sheet thickness direction and which is along the rolling direction) is used as the observation surface.

$$-0.20 \leq \Delta r \leq 0.20$$

As described above, to suppress earing, it is necessary to control the absolute value of $\Delta r$ of the steel sheet to be close to zero. When the relationship $-0.20 \leq \Delta r \leq 0.20$ is satisfied, ear to be formed is small, and thus an excellent earing property is exhibited. Therefore, $\Delta r$ is limited to this range.

Note that $\Delta r$ is determined by the following formula:

$$\Delta r = (r_0 + r_{90} - 2 \times r_{45})/2$$

wherein $r_0$ is the r value in the rolling direction, $r_{45}$ is the r value in a direction at 45° with respect to the rolling direction, and $r_{90}$ is the r value in a direction at 90° with respect to the rolling direction.

In addition to the above characteristics, the steel sheet preferably has a strain-aging index AI of 4.9 MPa or less. Satisfying the relationship AI≦4.9 MPa is effective to prevent stretcher strain.

The above-described ferrite structure, the grain size thereof, and the values of $\Delta r$ and AI are achieved by the combination of the component ranges described above and production conditions described below.

Our steels are advantageous in that the relationship $-0.20 \leq \Delta r \leq 0.20$ can be stably satisfied at a cold-rolling reduction in the range of 70% to 90%, and in particular, in the range of 70% to 85%, in which variation in $\Delta r$ is significant in the related art.

(3) Production Conditions

The cold-rolled steel sheet can be formed by, for example, hot-rolling a steel slab having the above-described component composition at a rolling finishing temperature of the $Ar_3$ transformation point or higher, optionally pickling the resulting steel sheet, cold-rolling the steel sheet at a rolling reduction in the range of 70% to 90%, and then annealing the steel sheet in a continuous annealing line at an annealing temperature in the range of 750° C. to 800° C. or 700° C. to 800° C., and optionally skin-pass-rolling the steel sheet as needed.

The steel slab used as a material of the hot rolling is preferably produced by continuous casting. After the continuous casting, the steel slab may be hot-rolled directly or after the steel slab is somewhat heated. Alternatively, after the continuous casting, the steel slab may be cooled and then reheated to perform hot rolling. In the case where the steel slab is reheated, the heating temperature is preferably in the range of 1,050° C. to 1,300° C. The reason for this is as follows. If the heating temperature during the reheating is lower than 1,050° C., in general, it tends to be difficult to control the rolling finishing temperature of the subsequent hot rolling to be the $Ar_3$ transformation point or higher, though it depends on the equipment. If the heating temperature during the reheating is higher than 1,300° C., the amount of oxide formed on the surface of the steel slab increases, and surface defects tend to be generated.

It is necessary to control the rolling finishing temperature of the hot rolling to be the $Ar_3$ transformation point or higher to obtain a uniform grain size after the rolling and to decrease planar anisotropy after the hot rolling. Here, the $Ar_3$ transformation point may be determined by a known method. For example, the $Ar_3$ transformation point can be determined by heating a test piece with a Formaster tester, and then examining the change in the coefficient of thermal expansion during cooling.

After the hot rolling, scale formed on the surfaces of the resulting steel sheet is removed, and the steel sheet is then cold-rolled at a rolling reduction in the range of 70% to 90%. The scale is generally removed by pickling. The pickling can be performed in accordance with a known method.

It is necessary to control the rolling reduction of the cold rolling to be 70% or more because a rolling reduction of less than 70% coarsens the grain size, thus causing surface roughening during working. As described above, from the standpoint of production, the upper limit of the rolling reduction is preferably 85% or less. In addition, satisfactory $\Delta r$ and a satisfactory grain size can be obtained in this range. However, the relationship $-0.20 \leq \Delta r \leq 0.20$ can be ensured when the rolling reduction is up to 90%. Therefore, the upper limit of the rolling reduction is 90%.

The steel sheet after the cold rolling is annealed in a continuous annealing line at an annealing temperature in the range of 750° C. to 800° C. in the case where the Nb content is in the range of 0.020% to 0.030% (high-Nb composition) or at an annealing temperature in the range of 700° C. to 800° C. in the case where the Nb content is 0.005% or more and less than 0.020% 7(low-Nb composition). The reason why the lower limit of the annealing temperature is 750° C. or 700° C. is that the steel sheet cannot be completely recrystallized in some cases at a temperature lower than the above temperature. The reason why the upper limit thereof is 800° C. is that the grain size is coarsened, and surface roughening may easily occur during working at a temperature higher than this temperature. The reason why the annealing is performed by continuous annealing is that the production with high productivity can be realized.

After the annealing, skin-pass rolling is preferably performed to tailor the shape of the steel sheet and the surface roughness thereof.

The elongation (elongation percentage) of the skin-pass rolling is not limited as long as the above object can be achieved, but is preferably in the range of 0.3% to 2.0%, in which such skin-pass rolling is generally performed. If the elongation percentage becomes excessive, the steel sheet becomes hardened, and degradation of elongation occurs, and thus a problem tends to occur in forming. Accordingly, it is desirable that an elongation percentage does not exceed 5%.

Applications of Steel Sheet

The steel sheet is produced as described above, but Ni plating, Sn plating, Cr plating, or plating of an alloy of these metals may be performed, as needed. Alternatively, diffusion annealing may be performed after plating to form a diffusion alloy plating film. Alternatively, any other surface coating film, such as a resin coating, may be formed in accordance with the use. In general, the steel sheet is subjected to a forming process. Such a forming process may be performed after the above-mentioned surface treatment, the resin coating, or the like is performed. Alternatively, after such a forming process is performed, the surface treatment, the resin coating, or, the like may be performed.

The steel sheet is particularly suitable for application to a battery can, which is used as a component of a battery, and battery cans can be produced with high yield of the steel sheet. The type of the battery (chemical cell) to which the steel sheet can be applied is not particularly limited. The steel sheet can be used for, for example, batteries and secondary batteries (such as a lithium-ion battery, a nickel-metal hydride battery, and a nickel-cadmium battery). In particular, the steel sheet can be suitably used for batteries produced by forming the steel sheet into a cylindrical shape having a diameter in the range of about 10 to 30 mm (or batteries produced by further forming such a cylindrical steel sheet into a rectangular tube).

In producing a battery can, various types of working methods such as the above-mentioned DI forming can be employed. In producing a battery, other necessary materials and components, such as a positive electrode material, a negative electrode material, a separator, and terminals, are charged and installed in the battery can.

EXAMPLE

Example 1

Steels No. 1 to 18 having the component compositions shown in Table 1 were smelted and steel slabs (cast slabs) were produced by continuous casting. Table 2 shows the values of Formulae (1) to (4) described above and the classification of each of the compositions. These steel slabs were heated to 1,250° C., and hot rolling was finished at 900° C., which is higher than the $Ar_3$ transformation point of these steels, namely, 880° C. After the hot-rolled steel sheets were pickled, the steel sheets were cold-rolled at the rolling reductions shown in Table 3. The cold-rolled steel sheets were then annealed in a, continuous annealing line at annealing temperatures shown in Table 3, and skin-pass rolling was then performed at an elongation percentage of 0.5%. Thus, samples of steel sheet-Nos. 1 to 33 were prepared. The $\Delta r$ values, the grain sizes, and the strain-aging index (AI) of the prepared, samples were examined by the following methods. However, for samples which were not recrystallized at 800° C. or lower or at a predetermined temperature, the characteristics of the steel sheets were not evaluated.

$\Delta r$: JIS No. 13 B tensile test pieces were prepared using the prepared steel sheet samples in directions at 0°, 45°, and 90° with respect to the rolling direction, and $r_0$, $r_{45}$, and $r_{90}$, which are the r values in directions at 0°, 45°, and 90°, were measured in accordance with JIS Z 2254. The value of $\Delta r$ was determined from the formula $\Delta r=(r_0+r_{90}-2r_{45})/2$.

Grain size: The average grain sizes of a ferrite structure of the prepared steel sheet samples were measured in accordance with the cutting method described in JIS G 0552 (1998). As described above, so that surface roughening does not occur when the steel sheets are worked into a battery case, it is necessary to control the grain size to be 12.0 μm or less.

AI: JIS No. 13 B tensile test pieces were prepared using the steel sheet samples in a direction at 0° with respect to the rolling direction. Mobile dislocations were introduced into the samples by introducing 8.0% of tensile strain, and an isothermal treatment was then performed at 100° C. for one hour. The AI Was calculated by the following formula. When the AI was 4.9 MPa or less, the steel sheet sample was evaluated that the sample had excellent strain aging resistance.

$AI$=(yield load after isothermal treatment−yield load before isothermal treatment)/(cross-sectional area of parallel portion of test piece before introduction of strain)

The results are shown in Table 3. The relationship between the rolling reduction in the cold rolling and $\Delta r$ is shown in FIG. 1. The results showed that, in the steel sheets Nos. 7 to 16, 18, 19, 22 to 25, 27, 30, and 33, which are steel sheets, $\Delta r$ was within ±0.20 and had an excellent earing property, and the grain size was 12.0 μm or less, and thus, surface roughening did not occur during working. In addition, among our examples, steel sheet Nos. 13 to 16, 22 to 24, and 30, whose Nb content is 0.005% or more and less than 0.020%, had excellent characteristics even at an annealing temperature of 700° C. or higher and lower than 750° C. Furthermore, the results of steel sheet Nos. 21 to 31 showed that appropriate amounts of, for example, Ti and B should not be determined in fixed ranges but should be controlled in consideration of the relationship with the contents of other elements. Note that, in all of our examples, the AI was 4.9 MPa or less and had excellent strain aging resistance.

Regarding Nos. 3, 6, 17, and 14, each of which had a $\Delta r$ of within ±0.20 but has a grain size of more than 12.0 μm, when deep drawing was performed at a drawing ratio of 2.0, surface roughening was observed. In contrast, regarding our steels, when deep drawing was performed under the same condition, surface roughening was not observed.

Furthermore, the AI of No. 31 was 15.5 MPa, and stretcher strain was generated by working (deep drawing under the same condition as that described above). In contrast, the AI of each of our steels was 4.9 MPa or less, and no stretcher strain was generated.

FIG. 1 shows an example of the relationship between the rolling reduction in the cold rolling (horizontal axis) and Δr (vertical axis) of steel sheet Nos. 1 to 4. The results showed that, in our cold-rolled steel sheets, Δr can be controlled within the range of ±0.20 at a rolling reduction in the cold rolling of 90% or less. In addition, in comparative examples (Nos. 1 and 2), when the rolling reduction decreased from 85% to 70%, Δr significantly increased. On the other hand, in our steels (Nos. 3 and 4), variations in Δr could be suppressed in this range. In the case where the rolling reduction increased from 85% to 90%, variations in Δr in our steels somewhat increased. However, as described above, Δr could be maintained within the range of ±0.20.

TABLE 1

| Steel No. | Chemical component (mass %) | | | | | | | | | |
|---|---|---|---|---|---|---|---|---|---|---|
| | C | Si | Mn | P | S | N | Al | Nb | Ti | B |
| 1 | 0.0008 | 0.01 | 0.19 | 0.010 | 0.011 | 0.0017 | 0.051 | 0.013 | 0.032 | 0.0002 |
| 2 | 0.0009 | 0.01 | 0.20 | 0.010 | 0.012 | 0.0020 | 0.051 | 0.014 | 0.032 | 0.0009 |
| 3 | 0.0019 | tr.* | 0.21 | 0.008 | 0.010 | 0.0012 | 0.041 | 0.027 | 0.017 | 0.0006 |
| 4 | 0.0023 | tr.* | 0.22 | 0.009 | 0.011 | 0.0020 | 0.038 | 0.026 | 0.005 | 0.0014 |
| 5 | 0.0015 | 0.01 | 0.20 | 0.009 | 0.010 | 0.0034 | 0.040 | 0.015 | 0.010 | 0.0010 |
| 6 | 0.0017 | 0.01 | 0.14 | 0.009 | 0.003 | 0.0015 | 0.036 | 0.015 | 0.020 | 0.0003 |
| 7 | 0.0021 | tr.* | 0.15 | 0.010 | 0.006 | 0.0022 | 0.055 | 0.008 | 0.015 | 0.0004 |
| 8 | 0.0019 | 0.01 | 0.15 | 0.010 | 0.007 | 0.0035 | 0.030 | 0.011 | 0.014 | 0.0010 |
| 9 | 0.0016 | 0.01 | 0.15 | 0.010 | 0.010 | 0.0032 | 0.030 | 0.015 | 0.010 | 0.0004 |
| 10 | 0.0015 | tr.* | 0.17 | 0.008 | 0.011 | 0.0030 | 0.035 | 0.015 | 0.013 | 0.0004 |
| 11 | 0.0016 | 0.01 | 0.20 | 0.009 | 0.010 | 0.0027 | 0.051 | 0.012 | 0.008 | 0.0012 |
| 12 | 0.0016 | 0.01 | 0.15 | 0.009 | 0.003 | 0.0026 | 0.041 | 0.016 | 0.013 | 0.0012 |
| 13 | 0.0025 | tr.* | 0.19 | 0.010 | 0.010 | 0.0025 | 0.038 | 0.025 | 0.025 | 0.0008 |
| 14 | 0.0024 | 0.01 | 0.23 | 0.008 | 0.012 | 0.0025 | 0.040 | 0.014 | 0.021 | 0.0008 |
| 15 | 0.0019 | 0.01 | 0.20 | 0.009 | 0.010 | 0.0015 | 0.036 | 0.016 | 0.006 | 0.0008 |
| 16 | 0.0025 | tr.* | 0.16 | 0.009 | 0.003 | 0.0015 | 0.055 | 0.014 | 0.006 | 0.0008 |
| 17 | 0.0020 | 0.01 | 0.27 | 0.008 | 0.011 | 0.0026 | 0.045 | 0.016 | 0.020 | 0.0008 |
| 18 | 0.0012 | 0.01 | 0.17 | 0.009 | 0.004 | 0.0014 | 0.042 | 0.007 | 0.010 | 0.0006 |

*tr.: less than the lower limit of analysis (Si <0.008%)

TABLE 2

| Steel No. | N − (14/48)Ti | B − (11/14) {N − (14/48)Ti} | C/12 − Nb/93 | 48 × (C/12 + N/14 − Nb/93) | Classification | Remarks |
|---|---|---|---|---|---|---|
| 1 | −0.008 | — | −0.00007 | — | Comparative steel | (Low-Nb(NbC) − (TiN) composition) |
| 2 | −0.007 | — | −0.00008 | — | Comparative steel | (Low-Nb(NbC) − (TiN) composition) |
| 3 | −0.004 | — | — | — | Steel of the present invention | High-Nb − (TiN) composition |
| 4 | 0.0005 | 0.0010 | — | — | Steel of the present invention | High-Nb − (TiN + N) composition |
| 5 | 0.0005 | 0.0006 | −0.00004 | — | Steel of the present invention | Low-Nb(NbC) − (TiN + N) composition |
| 6 | −0.004 | — | −0.00002 | — | Steel of the present invention | Low-Nb(NbC) − (TiN) composition |
| 7 | −0.002 | — | 0.00009 | 0.012 | Steel of the present invention | Low-Nb(NbC + C) − (TiN) composition |
| 8 | −0.0006 | — | 0.00004 | 0.014 | Steel of the present invention | Low-Nb(NbC + C) − (TiN) composition |
| 9 | 0.0003 | 0.0002 | −0.00003 | — | Comparative steel | (Low-Nb(NbC) − (TiN + N) composition) |
| 10 | −0.001 | — | −0.00004 | — | Steel of the present invention | Low-Nb(NbC) − (TiN) composition |
| 11 | 0.0004 | 0.0009 | −0.00003 | — | Steel of the present invention | Low-Nb(NbC) − (TiN + N) composition |
| 12 | −0.001 | — | −0.00004 | — | Comparative steel | (Low-Nb(NbC) − (TiN) composition) |
| 13 | −0.005 | — | — | — | Steel of the present invention | High-Nb − (TiN) composition |
| 14 | −0.004 | — | 0.00005 | 0.011 | Comparative steel | Low-Nb(NbC + C) − (TiN) composition |
| 15 | −0.0003 | — | −0.00001 | — | Steel of the present invention | Low-Nb(NbC) − (TiN) composition |
| 16 | −0.0003 | — | 0.00006 | 0.011 | Comparative steel | Low-Nb(NbC + C) − (TiN) composition |
| 17 | −0.0024 | — | −0.00004 | — | Comparative steel | High-Mn Low-Nb(NbC) − (TiN) composition |

TABLE 2-continued

| Steel No. | N − (14/48)Ti | B − (11/14) {N − (14/48)Ti} | C/12 − Nb/93 | 48 × (C/12 + N/14 − Nb/93) | Classification | Remarks |
|---|---|---|---|---|---|---|
| 18 | −0.002 | — | 0.00002 | 0.006 | Steel of the present invention | Low-Nb(NbC + C) − (TiN) composition |

TABLE 3

| Steel sheet No. | Steel No. | Rolling reduction of cold rolling (%) | Annealing temperature (° C.) | Δr | Grain size (μm) | Remarks | Classification |
|---|---|---|---|---|---|---|---|
| 1 | 1 | 70 | 780 | 0.71 | 17.0 | | Comparative example |
| 2 | 1 | 80 | 780 | 0.65 | 16.5 | | Comparative example |
| 3 | 1 | 90 | 780 | 0.03 | 15.0 | | Comparative example |
| 4 | 2 | 70 | 810 | 0.69 | 14.8 | | Comparative example |
| 5 | 2 | 80 | 810 | 0.35 | 14.0 | | Comparative example |
| 6 | 2 | 90 | 810 | −0.08 | 13.0 | | Comparative example |
| 7 | 3 | 70 | 780 | 0.08 | 11.0 | | Example of the present invention |
| 8 | 3 | 80 | 780 | 0.20 | 10.9 | | Example of the present invention |
| 9 | 3 | 90 | 780 | −0.20 | 10.0 | | Example of the present invention |
| 10 | 4 | 70 | 800 | 0.17 | 11.6 | | Example of the present invention |
| 11 | 4 | 80 | 800 | 0.16 | 9.0 | | Example of the present invention |
| 12 | 4 | 90 | 800 | −0.12 | 9.0 | | Example of the present invention |
| 13 | 5 | 85 | 730 | 0.18 | 11.0 | | Example of the present invention |
| 14 | 6 | 80 | 750 | 0.15 | 11.5 | | Example of the present invention |
| 15 | 7 | 85 | 720 | 0.12 | 11.0 | | Example of the present invention |
| 16 | 8 | 80 | 720 | 0.15 | 10.5 | | Example of the present invention |
| 17 | 6 | 65 | 750 | 0.18 | 12.2 | | Comparative example |
| 18 | 6 | 70 | 750 | 0.15 | 11.5 | | Example of the present invention |
| 19 | 6 | 90 | 750 | −0.15 | 11.0 | | Example of the present invention |
| 20 | 6 | 92 | 750 | −0.22 | 10.5 | | Comparative example |
| 21 | 9 | 80 | 750 | 0.25 | 11.5 | | Comparative example |
| 22 | 10 | 85 | 750 | 0.15 | 11.0 | | Example of the present invention |
| 23 | 11 | 70 | 740 | 0.18 | 11.0 | | Example of the present invention |
| 24 | 11 | 85 | 740 | 0.18 | 10.0 | | Example of the present invention |
| 25 | 11 | 90 | 740 | −0.15 | 9.8 | | Example of the present invention |
| 26 | 12 | 80 | 800 | — | — | Not recrystallized at 800° C. or lower. | Comparative example |
| 27 | 13 | 80 | 750 | 0.10 | 9.8 | | Example of the present invention |
| 28 | 13 | 80 | 730 | — | — | Not recrystallized. | Comparative example |
| 29 | 14 | 80 | 750 | 0.15 | 12.3 | | Comparative example |
| 30 | 15 | 80 | 740 | 0.10 | 11.0 | | Example of the present invention |

TABLE 3-continued

| Steel sheet No. | Steel No. | Rolling reduction of cold rolling (%) | Annealing temperature (°C.) | Δr | Grain size (μm) | Remarks | Classification |
|---|---|---|---|---|---|---|---|
| 31 | 16 | 80 | 750 | 0.15 | 11.2 | Stretcher strain was generated during working. | Comparative example |
| 32 | 17 | 80 | 800 | — | — | Not recrystallized at 800° C. or lower. | Comparative example |
| 33 | 18 | 80 | 740 | 0.15 | 11.5 | | Example of the present invention |

INDUSTRIAL APPLICABILITY

A cold-rolled steel sheet in which even when the rolling reduction of cold rolling is 85% or less, an average grain size of a ferrite structure can be reliably 12.0 μm or less and the relationship $-0.20 \leq \Delta r \leq 0.20$ can be reliably satisfied, and which has an excellent earing property can be produced. Furthermore, our cold-rolled steel sheet has an AI of 4.9 MPa or less and has excellent strain aging resistance.

The invention claimed is:

1. A cold-rolled steel sheet comprising:
by mass percent,
0.0040% or less of C,
0.02% or less of Si,
0.14% to 0.25% of Mn,
0.020% or less of P,
0.015% or less of S,
0.0040% or less of N,
0.020% to 0.070% of Al,
0.020% to 0.030% of Nb,
0.005% to 0.030% of Ti,
0.0003% to 0.0010% of solid solution B,
with total B in a content satisfying formula (1) or formula (2), and the balance composed of Fe and inevitable impurities,
wherein the average grain size of a ferrite structure is 9.0 μm to 12.0 μm, and
planar anisotropy Δr of an r value (Lankford value) of the steel sheet satisfies the relationship $-0.15 \leq \Delta r \leq 0.20$;
(A) in the case of $N-(14/48)Ti>0$, $$0.0003 \leq B-(11/14)\{N-(14/48)Ti\} \leq 0.0010 \quad (1)$$

(B) in the case of $N-(14/48)Ti \leq 0$, $$0.0003 \leq B \leq 0.0010 \quad (2)$$

wherein each of the symbols of elements in formulae (1) and (2) represents the content (mass percent) of the element.

2. A battery comprising a battery can produced by forming the steel sheet according to claim 1.

3. A method of producing a battery comprising deep-drawing the steel sheet according to claim 1 to form a battery can.

4. A cold-rolled steel sheet comprising:
by mass percent,
0.0040% or less of C,
0.02% or less of Si,
0.14% to 0.25% of Mn,
0.020% or less of P,
0.015% or less of S,
0.0040% or less of N,
0.020% to 0.070% of Al,
0.005% or more and less than 0.020% of Nb,
0.0003% to 0.0010% of solid solution B,
Ti in a content satisfying formula (3) or formula (4),
with total B in a content satisfying formula (1) or formula (2), and the balance composed of Fe and inevitable impurities,
wherein the average grain size of a ferrite structure is 9.0 μm to 12.0 μm, and
planar anisotropy Δr of an r value (Lankford value) of the steel sheet satisfies the relationship $-0.15 \leq \Delta r \leq 0.20$;
(A) in the case of $N-(14/48)Ti>0$, $$0.0003 \leq B-(11/14)\{N-(14/48)Ti\} \leq 0.0010 \quad (1)$$

(B) in the case of $N-(14/48)Ti \leq 0$, $$0.0003 \leq B \leq 0.0010 \quad (2)$$

(a) in the case of $C/12-Nb/93 \leq 0$, $$0.005 \leq Ti \leq 0.020 \quad (3)$$

(b) in the case of $C/12-Nb/93>0$, $$48 \times \{(C/12+N/14)-Nb/93\} \leq Ti \leq 0.020 \quad (4)$$

wherein each of the symbols of elements in formulae (1) to (4) represents the content (mass percent) of the element.

5. A battery comprising a battery can produced by forming the steel sheet according to claim 4.

6. A method of producing a battery comprising deep-drawing the steel sheet according to claim 4 to form a battery can.

* * * * *